May 10, 1960   R. E. PETERSON   2,936,187
FLUID LEAKAGE PROOF ENTRANCE SEAL
Filed Nov. 10, 1955   2 Sheets-Sheet 1

INVENTOR
ROBERT E. PETERSON
BY
Lee J. Huntberger
ATTORNEY

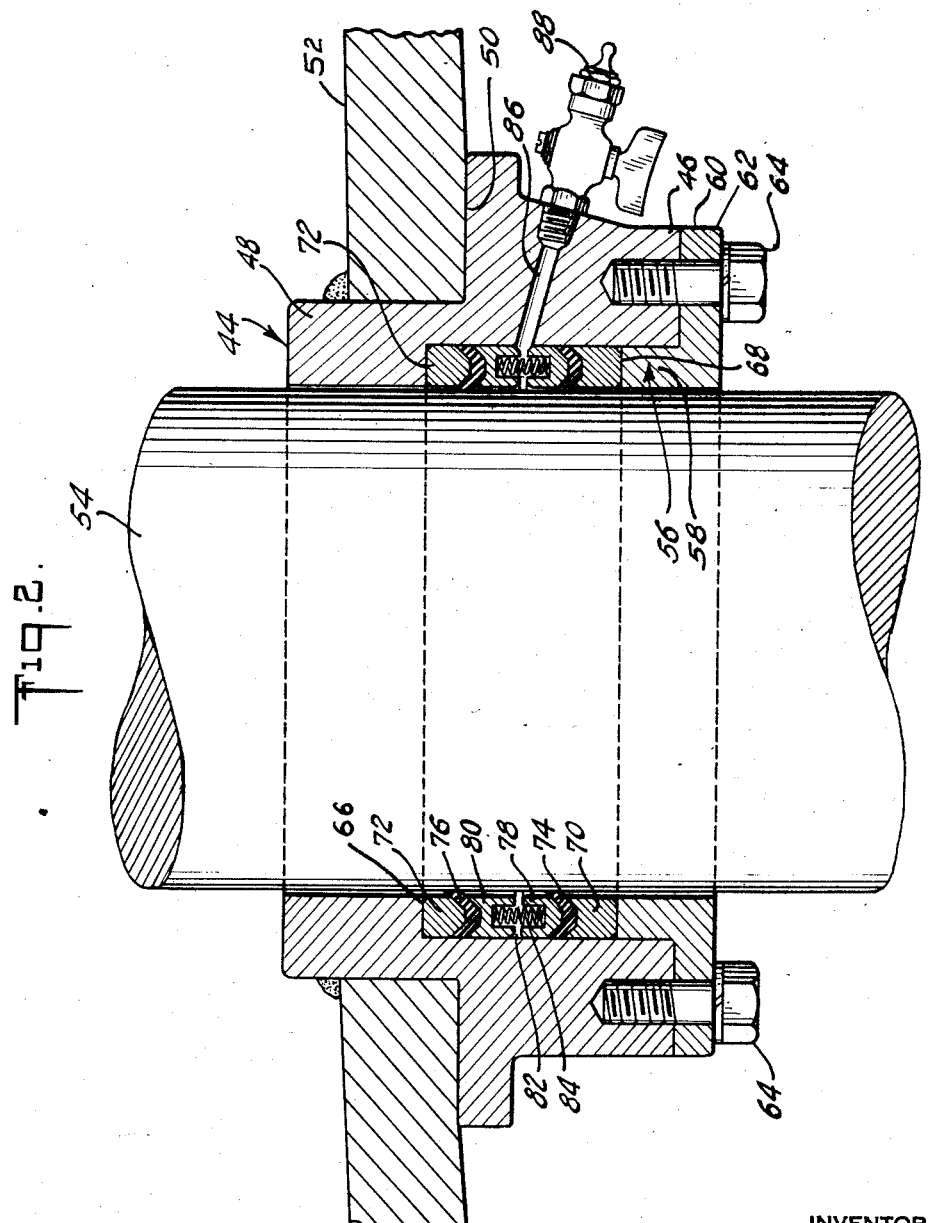

2,936,187

FLUID LEAKAGE PROOF ENTRANCE SEAL

Robert E. Peterson, Old Lyme, Conn.

Application November 10, 1955, Serial No. 546,291

2 Claims. (Cl. 286—28)

(Granted under Title 35, U.S. Code (1952), sec. 266)

The invention described herein may be manufactured and used by or for the Government of the United States of America for governmental purposes without the payment of any royalties thereon or therefor.

This invention relates to devices for providing fluid proof seals and more particularly relates to devices capable of providing proof against leakage where an electrical conduit, a shaft, or like structure passes from a fluid to a non-fluid environment.

One of the most persistent difficulties encountered where an apparatus such as a cable or a periscope shaft or other like structure extends into a dry environment from a liquid environment is the presence of leakage at the point where such change of environment is made. For example, for years submarine sonar has experienced a continuous series of flooded hydrophones and cable stuffing tubes which leak, primarily because of improperly packed glands. In the same manner, periscope shaft packings have experienced a common characteristic of leakage, particularly at periscope depths.

To overcome the difficulty of such leakage, the heretofore used methods have been the utilization of standardized stuffing tubes, the use of standard cables, and the employment of molded cable grommets in accordance with standard molds. In the case with cables, one deficiency still remains, and that is the necessity of dependence upon the judgment of the individual who packs the cable. It has been found that even the best qualified personnel frequently fail to pack the cable properly at initial installation and in addition the only means of compensating for the contraction or "cold flow" of the elastic parts which occurs under pressure cycling is to retighten the packing gland periodically. This of course is highly impractical.

Accordingly, a cable such as one entering a transducer or hydrophone intended for submarine installation should be packed so that after initial assembly, no further tightening is required during the life of the unit. There should be provided an automatic means of taking up any looseness which may subsequently result due to cold flow of the packing or of the packed cable. A stop should be provided so that unskilled personnel can assemble the packing with the proper amount of compression. The design of the stop should be such that a visual indication can show whether or not the cable has been properly packed. Such compression on the packing is critical in that it should be sufficient so that the cable will not slip under depth charge shock and yet must not be great enough to cause excessive cold flow of the elastic parts or damage to the cable.

Accordingly, it is the primary object of the present invention to provide an apparatus, utilizable in conjunction with cables, shafts, and the like which is fluid-leakage proof substantially throughout its life and wherein no dependence need be placed upon the judgment of the operator assembling the device.

It is a further object to provide a cable-stuffing tube which is fluid-leakage proof, which requires no further tightening durnig its life once it is initially packed, wherein a desired critical amount of compression on the packing may be readily made and wherein a visual inspection can indicate whether or not proper packing has been done.

It is another object to provide a shaft packing which is fluid-leakage proof wherein the pressure of the packing within the device is automatically balanced, and wherein any load torque required in the training or reciprocation of such shaft is substantially reduced.

It is another object of the present invention to provide an efficient and reliable means for splicing cables in submarine installations when the cables are external to the pressure hull.

In accordance with a general embodiment of the present invention there is provided an apparatus which comprises the first tubular member having a first end portion with a first larger inner diameter and a second end portion with a second smaller inner diameter, a ledge being provided at the union of the first and second inner diameters. A second tubular member is provided, the second member comprising a third end portion disposed within the first end portion and a fourth wider end portion, the fourth end portion effectively providing a flange at one end of the third end portion with which the terminus of the first end portion makes an abutting contact. A third tubular member is provided, one end of which makes an abutting contact with the ledge and tensioning means having an opening therethrough is disposed intermediate the other ends respectively of the second and third members.

In accordance with a particular embodiment of the present invention, there is provided a fluid-leakage proof stuffing tube assembly which comprises a first tubular metallic member having a first end portion having a first greater inner diameter and a second end portion having a second smaller inner diameter, a ledge being provided at the union of said first and second diameters. A second tubular metallic member is provided which has an inner diameter substantially equal to the second diameter, and comprises a third end portion disposed within the first end portion and a fourth wider end portion, the fourth end portion effectively providing a flange at one end of the third end portion with which the terminus of the first end portion makes an abutting contact. A third elastic tubular member is provided which consists of an elastomer having a relatively low coefficient of expansion, the diameter of the bore therethrough being substantially equal to the second diameter, the outer diameter thereof being substantially equal to the first diameter. One end of the third member makes an abutting contact with the ledge. Tensioning means such as a lock washer and having an outer diameter substantially equal to the first diameter and an inner diameter substantially equal to the second diameter is disposed intermediate the other ends respectively of the second and third members, the openings through the second end portion, the second and third members and the tensioning means being in register to provide a continuous bore of substantially uniform diameter through the assembly.

In accordance with a second particular embodiment of the present invention, there is provided a shaft packing assembly which comprises a first tubular metallic member having a first end portion with a first larger diameter and a second end portion with a second smaller diameter, a ledge being provided at the union of the first and second inner diameters. A second tubular metallic member having a bore therethrough with a diameter substantially equal to the second diameter is provided, the second member comprising a third end portion disposed within the terminal portion of the first end portion and having an outer diameter substantially equal to the first diameter and a fourth wider end portion, the fourth end portion effectively providing a flange at one end of the first end portion with which the terminus of the first end portion makes an abutting contact. First and second metallic ring members respectively having outer diameters equal to the first diameter and inner diameters equal to the second diameter are provided, the first ring member being positioned on the ledge and the second ring member being positioned in contact with the end of the third portion. Third and fourth elastic ring members are provided having outer diameters equal to the first diameter and inner diameters substantially equal to the second diameter, the ring members being juxtaposed on the first and second ring members respectively. Tensioning means is disposed intermediate the third and fourth elastic ring members and grease fills the remaining space between the third and fourth elastic ring members.

In accordance with a third particular embodiment of the present invention, there is provided a cable splicing device comprising a tubular metallic member, the end portions thereof having a first larger inner diameter and the portion intermediate the end portions having a second smaller inner diameter, first and second ledges being provided at the union of the first and second inner diameters. First and second tubular elastic grommets having an outer diameter equal to the first diameter and an inner diameter equal to the second diameter are disposed within the end portions and have one end in abutting contact respectively with the first and second ledges. Second and third metallic members are provided respectively comprising third and fourth portions which have inner diameters substantially equal to the second diameter, the third portions being disposed within the first portion and having an outer diameter substantially equal to the first diameter, the fourth portions being wider than the third portions whereby flanges are effectively provided at one end of the respective third portions with which the termini of the end portions make an abutting metal to metal contact. Tensioning means are disposed intermediate the other ends respectively of the third portions and the grommets.

Other objects and many of the attendant advantages of this invention will be readily appreciated as the same becomes better understood by reference to the following detailed description when considered in connection with the accompanying drawings wherein:

Fig. 2 is a view, partly in section of a shaft-packing assembly embodiment of the present invention.

Figure 1:
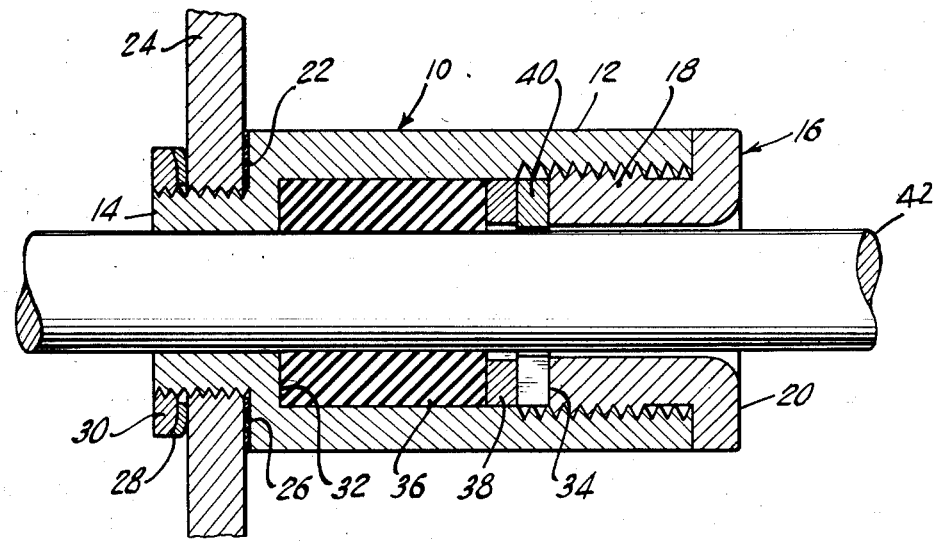
Fig. 1 is a view partly in section of a stuffing tube assembly embodiment of the present invention.

Referring now more particularly to the embodiment of the invention shown in Fig. 1, there is shown a stuffing tube embodiment of the present invention. Included therein is a first tubular member 10 which comprises end portions 12 and 14. End portion 14 has a smaller inner diameter than end portion 12. As is shown, the terminal portion of end portion 12 may be internally threaded to threadedly engage a second threaded member 16 which may suitably comprise a flanged nut. Nut 16 preferably has an inner diameter substantially equal to the inner diameter of end portion 14, the threaded section 18 thereof having an outer diameter equal to the inner diameter of end portion 12 and a flange 20 having an outer periphery substantially coextensive and coincident with the outer periphery of end portion 12. End portion 14 may have a smaller outer diameter than end portion 12, so that upon extending through the hull of a ship, a fixed wall separating a dry inner from a liquid outer environment, or other fixed barrier device, the junction of the outer peripheries of end portions 12 and 14 form a perpendicular surface 22 which makes a butt joint with the hull 24. Such butt joint may be firmly made by providing a male thread about end portion 14 so that it may threadedly engage a corresponding female thread in the periphery of the opening in hull 24, etc. through which it extends. Such an arrangement permits ready removal and reinsertion of the stuffing tube. In the threaded arrangement, it is preferable to include a gasket 26 intermediate hull 24 and surface 22 and a fingered lock washer 28 serrated on one face and a lock nut 30 in threaded engagement with end portion 14 on the opposite or inboard side of hull 24. Of course, the stuffing tube may be permanently affixed to hull 24 by brazing or other method of permanent affixation. In such a case, neither the outer periphery of end portion 14 nor the inner periphery of the opening in hull 22 through which said end portion extends need be threaded.

At the point of union of the inner diameters of end portions 12 and 14, a ledge 32 is provided. Likewise, the end 34 of threaded section 18 of nut 16 forms a second ledge bounding a tubular coaxial space having an outer diameter equal to the inner diameter of end portion 12. In this space, there are disposed, an elastic tubular grommet 36 preferably consisting of an elastomeric material such as polychlorprene, it being preferred that the elastomeric material be one that does not contract or cold flow at temperatures in excess of 40° F. One end of grommet 36 abuts against ledge 32. In contact with the other end of grommet 36 is one face of a gland ring 38 which may be of a suitable rigid metal. Disposed between the other face of ring 38 and ledge 34 and substantially intimately in contact therewith is a lock washer 40 of a suitable hard metal having high spring stress in an axial direction, an example of such metal being "K-Monel" metal which is an alloy comprising Ni, 66; Cu, 29; Al, 2.75 and Fe, 0.9., has a tensile strength of 90,000 to 200,000 pounds per square inch and a Brinell hardness of 140–320. Since the function of lockwasher 40 in the stuffing tube is to provide tensioning action as will be explained more fully hereinbelow, other suitable tensioning means such as a coiled spring may be utilized in place thereof. The outer diameters of grommet 36, ring 38 and lockwasher 40 are substantially equal to the inner diameter of end portion 12 and their inner diameters are substantially equal to the inner diameter of end portion 14. When the stuffing tube is assembled, the openings through nut 16, lock washer 40, ring 38, grommet 36 and the inner diameter of end portion 14 are substantially in register to provide a substantially continuous bore for the reception of an electric cable 42 which extends therethrough from the liquid environment to the inner dry environment on the other side of hull 24. It is to be noted that whereas there may be clearance between cable 42 and nut 16, and lock washer 40, grommet 36 is in intimate contact with the cable.

It is seen that with the device of Fig. 1 there is provided a stuffing tube whose life time operability is not dependent upon the skill of the person packing the cable. With the arrangement of end portion 12 and the flange 20 of nut 16, a metal to metal contact is provided at flange 20 so that a tight contact is assembled. Since it is usually preferred that grommet 36 be under a given compression, say about 2000 pounds per square inch, a mechanical stop is provided by this arrangement. For example, nut 16 may first be pulled down finger tight at which point flange 20 may be a given distance from the end of first end portion 12. If it is less than this distance, it indicates that lock washer 40 or gland ring 38 may have been omitted. If it is more than the given distance, it may show that some component part is not properly dimensioned. After such initial check, the nut may be pulled down by a wrench as far as it will go, and visual inspection can insure that the flange is hard on end portion 12. Lock washer 40 assists in providing the initial degree of compression and when the temperature drops to or below a figure at which the elastomeric material comprising grommet 36 begins to contract, then the tensioning action of lock washer 40 or other suitable tensioning means tends to take up the slack created by the contraction so that the grommet is continually maintained under the correct compression. Thus, there is no requirement for periodic tightening throughout the life of the stuffing tube, and it is impervious both to gas and liquid leakage throughout such life.

Referring now more particularly to Fig. 2, there is shown a shaft packing assembly embodiment of the present invention. A tubular member 44 which may consist of bronze comprises end portions 46 and 48, end portion 46 having the larger inner diameter and end portion 48 having a smaller inner diameter Member 44 corresponds in structure and function to member 10 of the device of Fig. 1 and thus, similarly, end portion 48 may have an outer periphery which is smaller than the outer periphery of end portion 46 so that a surface 50 is formed at their union which is adapted to make contact with a barrier wall such as the hull 52 of a ship. A shaft 54 may pass from an outer liquid environment to an inner substantially dry environment through hull 52. It is to be noted that a relatively large abutting surface 50 may be provided by widening such point of union to a flange like configuration. Making an abutting metal to metal contact with the end of first end portion 46 is a second tubular member 56 which has an inner diameter substantially equal to the inner diameter of end portion 48. Member 56 comprises one section 58 which has an outer diameter substantially equal to the inner diameter of end portion 46 and a second section 60 having an outer diameter substantially equal to the outer diameter of end portion 46 so that effectively a flange 62 is provided for making the metal to metal contact between end portion 46 and section 60. Extending through section 60 is a circumferential array of spaced bolts 64 which threadedly engage the terminal portions of end portion 46. It is seen that member 56 and bolts 64 effectively correspond to the flanged nut 16 of the device of Fig. 1.

The junction of the inner diameters of end portions 46 and 48 form a first ledge 66 and the end of section 58 forms a second ledge 68 which defines a tubular coaxial space bounded by the inner periphery of end portion 46, ledges 66 and 68 and the outer periphery of shaft 54 extending through the assembly. Within this space, there are positioned first and second metallic ring members 70 and 72, each of which has one free face in abutting contact with ledges 66 and 68 respectively. In contact with the other faces, respectively, of ring members 70 and 72, are third and fourth elastic ring members 74 and 76 which consist of an elastomeric material, preferably polychlorprene. Resting on the other faces of third and fourth elastic ring members 74 and 76 are respectively one face of fifth and sixth metal ring members 78 and 80, an annular space 82 being defined between the opposing other faces of fifth and sixth ring members 78 and 80. A circumferential array of spaced opposed counter bores are provided in the other face of fifth and sixth members 78 and 80 to receive tensioning means 84 such as coiled springs which are normally maintained under a given compression. As shown, third and fourth elastic ring members 74 and 76 may be of a substantially V configuration in their transverse aspect in which case to intimately accommodate this configuration, ring members 70 and 72 may have V or inverted V transverse configurations. In such case, first and second ring members 70 and 72 could properly be designated for convenience as female and male adapter rings, respectively, fifth and sixth ring members 78 and 80 could be designated as male and female spring adapter rings, respectively, and third and fourth elastic ring members 74 and 76 could be designated as inboard and outboard V-rings, respectively. It is seen that the adapter rings, V-rings, and coiled spring arrangement of the device of Fig. 2 correspond to the grommet 36, gland ring 38 and lock washer 40 arrangement of the device of Fig. 1. End portion 46 has an aperture 86 extending transversely therethrough which opens into annular space 82 and through which grease may be injected with petcock and grease fitting 88. When the apparatus is assembled, since the inner openings of end portion 48, the ring members, and member 56 are substantially equal, their being in register provides a substantially continuous bore of uniform diameter for the reception of shaft 54. It is to be noted that whereas the inner diameters of member 56, end portion 48 and rings 70, 72, 78 and 80 are such as to permit a small amount of clearance between their inner respective circumferences and the outer circumference of shaft 54, the inner diameter of elastic rings 74 and 76 is such as to result in an intimate contact between them and shaft 54.

The arrangement of the device of Fig. 2 operates in a manner corresponding to the device of Fig. 1. The metal to metal abutting contact arrangement of section 60 and the end of end portion 46 in combination with bolts eliminates the necessity of reliance on the individual making the packing. Tensioning means 84 serves to take up any slack caused by the contraction or cold flow of elastic ring members and also serves to maintain the elastic ring members under desired adequate compression.

The embodiment of Fig. 2 in addition to providing a fluid leakage proof arrangement also provides a device which automatically adjusts to increased water pressure while keeping the torque loading on the shaft quite low. For example, should sea water enter between shaft 54 and end portion 48, the water pressure would tend to spread elastic ring member 76 tighter against shaft 54 and to exert a downward pressure to close space where the tensioning means is disposed increasing torque loading. Now, if the chamber comprising annular space 82 and the spaces surounding tensioning means 84 are filled with grease, the grease in such chamber provides a back pressure due to its incompressibility and the pressure due to the sea water is transmitted through the grease chamber to the elastic ring member 74. This causes a balanced pressure on the elastic ring member 76 except for the initial preloading provided by tensioning means 84, i.e., the coiled springs. Therefore, increases in external water pressure result in no increased loading on ring member 76, the outboard V-ring. In addition, the grease under pressure provides better lubrication for the inboard V-ring, i.e., elastic ring member 74, effectively resulting in the achievement of a two-ring seal with a torque loading of approximately one ring. The arrangement of Fig. 2 may be advantageously utilized in any situation where a rotating or reciprocating shaft extends from a fluid to a different fluid environment and where low turning torque or low reciprocating friction is desired. Examples which may be cited of such utilization are periscope shafts, and shafts extending through pressure walls into chemical tanks, oil wells through motor boat hulls, etc.

Figure 3:
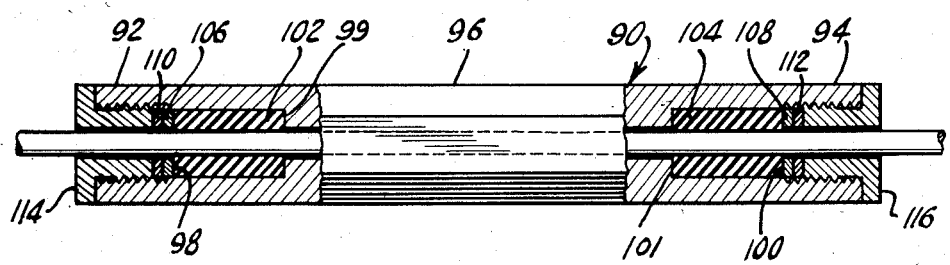
Fig. 3 is a view partly in section of a "quicksplice" device embodiment of the present invention.

Referring now to Fig. 3, there is shown a device advantageously utilizable in splicing cables wherein the cable is located in a fluid environment exterior to a pressure wall or hull. For example, in submarine installation work, it is frequently necessary to splice two cables together. If these cables are external to the pressure hull, it has been the custom to make a molded splice. This requires skilled splicers and special molding equipment. If the weather is wet or cold, the molding equipment frequently does not function properly and a defective splice results. In addition, when a submarine dives and surfaces, there is a squeezing action applied to the molded splice which occasionally causes shorting of the splice.

The device includes a metallic tubular member 90 which protects the soldered connections of joined cables from the squeezing action of sea pressure. Member 90 may have a polygonal configuration along its outer periphery such as a hexagonal shape to permit it to be held by a wrench or clamped firmly to prevent rotation when cable packing nuts are pulled down as will be further explained. Member 90 comprises end portions 92 and 94 having a first larger inner diameter and an intermediate portion 96 between the end portions and having a second smaller diameter. At the unions of the inner diameters of end portions 92 and 94 and the inner diameter of intermediate portion 96, ledges 99 and 101 are provided. Tubular elastic grommets 102 and 104 having respective outer diameters equal to the inner diameters of end portions 94 and 96 and inner diameters substantially equal to the diameter of intermediate portion 96 each have one end in abutting contact with ledges 99 and 101, respectively. Flat metallic ring washers 106 and 108 having outer diameters equal to the diameter of the end portions 94 and 96 and inner diameters substantially equal to the diameter of intermediate portion 96 have one face in abutting contact with the other ends of grommets 102 and 104. Lock washers 110 and 112 similar in size and configuration to flat washers 106 and 108 are disposed relatively snugly between the other faces of the flat washers and the ends of flanged nuts 114 and 116 which threadedly engage the terminal portions of end portions 92 and 94, end portions 92 and 94 making an abutting metal to metal contact with the flanges on nuts 114 and 116, respectively. Here again, as with the devices of Figs. 1 and 2, the tight metal to metal contact eliminates the need for reliance on the skill of the splicer. The elastomeric material which comprises the grommets is preferably polychlorprene and should be one which does not contract or cold flow at temperatures below 40° F. The lock washer may be replaced by other suitable tensioning means and serves to automatically compensate for loosening of the packing due to temperature changes so that the devcie will not need any further adjustment substantially throughout its lifetime.

An unskilled operator utilizing the device of Fig. 3 can join two cables together in a few minutes whereas the molded rubber method of splicing normally requires several hours of labor by a skilled operator using special molding equipment. The device may be constructed with a flange (not shown) on the body for welding or bolting to bulkheads or hulls to make it utilizable as a "through the hull" fitting. When used in the latter arrangement, the body of the device could be enlarged and additional packing glands added at each end to accommodate additional cables. It is further to be noted that due to the positive sealing action provided by the lock washers 110 and 112 or other suitable tensioning means, the body of the device need not be filled with potting compounds. This in turn makes possible easy replacement or removal of cables as well as re-use of the "quick-splice."

Obviously many modifications and variations of the present invention are possible in the light of the above teachings. It is therefore to be understood that within the scope of the appended claims the invention may be practiced otherwise than as specifically described.

I claim:

1. A packing construction for use where an elongated element extends through and is movable in an opening in a wall separating a dry environment from a liquid environment, and a pressure differential exists between said environments, which comprises a tubular member to be secured in said opening in a water tight coupling thereto and having a passage from end face to face thereof, said element being movable in and substantially filling said passage in said member, said member having its said passage counterbored for part way only of the passage length from the dry environment side to provide an internal shoulder facing the dry environment side, a stuffing bushing surrounding and movable on said element, and received in said counterbored part of the said passage for endwise movement in that passage, means for securing said bushing in said passage at the outer end of said counterbored part thereof, a ring of approximately incompressible material surrounding and approximately fitting and sliding endwise on said element and abutting the face of said passage shoulder, another ring of similar material surrounding and approximately fitting and sliding endwise on said element and abutting the inner end face of said bushing, a pair of gasket rings of highly elastic material surrounding and slidable on said element and in contact with the periphery of said element and the periphery of said counterbored part of the wall of said passage and disposed between said two rings of incompressible material, a pair of rings of incompressible material surrounding and approximately fitting and slidable along said element and also approximately fitting the periphery of and slidable along the peripheral wall of the counterbored part of said passage and disposed between said gasket rings, spring means interposed between the rings of the pair that are disposed between said gasket rings and urging the gasket rings apart under substantial pressure, said member having a passage from the space between the rings of said second mentioned pair to the periphery of said member on the dry environment portion through which a lubricant can be forced into the counterbored part of the first mentioned passage and held therein, and means for closing the outer end of said lubricant passage after lubricant has been introduced into said counterbored passage whereby the lubricant in said counterbored part of said passage can develop a back pressure opposing sea pressure attempting to enter said counterbored part and release the squeeze on the packing, which results in a low movement torque on said element and equalizes automatically the said pressure differential on the packing, said elastic gasket rings being V-shaped with the legs of the V's all extending in the same direction toward the high fluid pressure side of the rings at oblique angles to the axis of said element.

2. A packing construction for use where a rod passes through and is movable in a submerged opening in a wall separating a body of water from a gaseous atmosphere, which comprises a tubular member having one end secured in and peripherally fitting said opening and having an endwise passage from end to end therethrough, a rod movable in said passage and at both ends extending beyond the ends of said member, said passage having a counterbore extending from one end for a part only of the length of the passage to provide an internal shoulder facing said one end, a pair of relatively rigid rings in said counterbore around said rod and spaced apart axially of the rod, another pair of relatively rigid rings in said counterbore around said rod and disposed end to end between the rings of the first mentioned pair, resilient means interposed between and urging apart in a direction lengthwise of said rod, the rings of said another pair, a pair of elastic gasket rings disposed in said counterbore and surrounding and concentric with said rod, with one between the adjacent end faces of each of the rigid rings of the first pair and the nearest one of the second pair, means for compressing all of said rings together and closing the outer end of the counterbore of said member, with said resilient means under substantial compression, said member having a small passage from its exterior to the counterbore in the space between the rigid rings of the second mentioned pair, and valve controlled means connected to the other end of said small passage for passing a lubricant to said counterbore under pressure and holding it against escape therefrom, said gasket rings being V-shaped with the legs of the V's all extending in the same direction along and in contact with said rod and the wall of said counterbore, and oblique thereto, toward the end of said counterbore nearest the water engaging end of said member, and the faces of said rigid rings which abut the gasket rings having shapes which fit the faces of the gasket rings.

References Cited in the file of this patent

UNITED STATES PATENTS

| | | |
|---|---|---|
| 328,846 | Hough | Oct. 20, 1885 |
| 1,142,642 | Van Maanen | June 8, 1915 |
| 2,009,423 | Wheeler | July 30, 1935 |
| 2,022,529 | Townsend | Nov. 26, 1935 |
| 2,371,753 | Fullman | Mar. 20, 1945 |
| 2,628,112 | Hebard | Feb. 10, 1953 |
| 2,689,145 | Magos et al. | Sept. 14, 1954 |